(12) United States Patent
Andreussi

(10) Patent No.: US 9,346,688 B2
(45) Date of Patent: May 24, 2016

(54) SEPARATOR APPARATUS FOR GAS-WATER-OIL MIXTURES, AND SEPARATION PROCESS

(71) Applicant: TEA Sistemi S.p.A., Pisa (IT)

(72) Inventor: Paolo Andreussi, Pisa (IT)

(73) Assignee: TEA SISTEMI S.P.A., Pisa (IT)

( * ) Notice: Subject to any disclaimer, the term of this patent is extended or adjusted under 35 U.S.C. 154(b) by 81 days.

(21) Appl. No.: 14/386,948

(22) PCT Filed: Apr. 4, 2013

(86) PCT No.: PCT/IB2013/052687
§ 371 (c)(1),
(2) Date: Sep. 22, 2014

(87) PCT Pub. No.: WO2013/150473
PCT Pub. Date: Oct. 10, 2013

(65) Prior Publication Data
US 2015/0034570 A1    Feb. 5, 2015

(30) Foreign Application Priority Data

Apr. 4, 2012  (IT) ................ FI2012A0071

(51) Int. Cl.
| | | |
|---|---|---|
| *B01D 17/02* | (2006.01) | |
| *B01D 19/00* | (2006.01) | |
| *C02F 1/40* | (2006.01) | |
| *E21B 43/34* | (2006.01) | |
| *E21B 43/36* | (2006.01) | |
| *C02F 1/20* | (2006.01) | |
| *C02F 101/32* | (2006.01) | |
| *C02F 103/10* | (2006.01) | |

(52) U.S. Cl.
CPC .............. *C02F 1/40* (2013.01); *B01D 17/0211* (2013.01); *B01D 17/0214* (2013.01); *B01D 19/0042* (2013.01); *C02F 1/20* (2013.01); *E21B 43/34* (2013.01); *E21B 43/36* (2013.01); *C02F 2101/32* (2013.01); *C02F 2103/10* (2013.01); *C02F 2209/03* (2013.01); *C02F 2209/42* (2013.01)

(58) Field of Classification Search
CPC ........... B01D 17/0211; B01D 17/0214; B01D 19/0042; C02F 1/20; C02F 1/40; C02F 2101/32; C02F 2103/10; C02F 2209/03; C02F 2209/042; E21B 43/34; E21B 43/36
USPC ........... 210/800, 801, 104, 253, 532.1; 95/19, 95/24, 253, 259; 96/157, 174, 182, 183, 96/188, 189
See application file for complete search history.

(56) References Cited

U.S. PATENT DOCUMENTS 1,920,468 A * 8/1933 Jones .................. B01D 17/0211
210/120
2,675,126 A * 4/1954 Williams ........... B01D 19/0042
210/104

(Continued)

FOREIGN PATENT DOCUMENTS

| EP | 0955076 A1 | 11/1999 |
|---|---|---|
| GB | 2394737 A1 | 5/2004 |

(Continued)

*Primary Examiner* — Frank Lawrence
(74) *Attorney, Agent, or Firm* — Lucas & Mercanti, LLP.

(57) ABSTRACT

The present invention refers to a triphasic separator for the separation of oil-water-gas mixtures used in the field of oil extraction from land or sea wells, suitable in particular, but not exclusively, for installation on the seabed in subsea wells.

15 Claims, 3 Drawing Sheets

(56) References Cited

U.S. PATENT DOCUMENTS

| | | | |
|---|---|---|---|
| 3,528,222 A * | 9/1970 | Waterman | B01D 17/0208 96/157 |
| 8,496,740 B1 * | 7/2013 | Ball, IV | E21B 43/34 210/537 |
| 2009/0282985 A1 * | 11/2009 | Whiteley | B01D 17/0211 96/189 |
| 2013/0025451 A1 * | 1/2013 | Peuker | B01D 19/0057 95/253 |

FOREIGN PATENT DOCUMENTS

| | | |
|---|---|---|
| WO | 2004/004863 A1 | 1/2004 |
| WO | 2011/054192 A1 | 5/2011 |

* cited by examiner

SEPARATOR APPARATUS FOR GAS-WATER-OIL MIXTURES, AND SEPARATION PROCESS

CROSS-REFERENCE TO RELATED APPLICATIONS

This application is a 371 of PCT/IB2013/052687, filed Apr. 4, 2013, which claims the benefit of Italian Patent Application No. FI2012A000071, filed Apr. 4, 2012, the contents of each of which are incorporated herein by reference.

Field of the Invention

The present invention refers in general to the field of oil extraction, and more specifically to an apparatus for the separation of mixtures of gas, water and oil, suitable for onshore, offshore and subsea installations.

BACKGROUND OF THE INVENTION

There are currently thousands of wells for extracting oil, both on land and under the sea, the latter exploited thanks to suitable platforms where extraction is controlled remotely and where the oil is collected and possibly treated before being transferred to mainland.

The composition of the extracted oil can vary with the age of the deposit: in addition to natural gas, a variable amount of water is generally present, and it increases as the age of the well increases. It is generally at the surface that gas and water are separated from the oil once extracted, by means of "triphasic" separators, i.e. capable of separating the three phases present in the mixture—oil, water and gas—then gas and water are collected and possibly re-injected under pressure into the reservoir to maintain its high productivity.

Conventional triphasic separators installed at the surface, on mainland in land reservoirs or on a platform in the case of subsea reservoirs, are bulky apparatuses, generally consisting of horizontal cylindrical containers of great size, with which it is possible indeed to rid the crude oil of gas and water before exportation from the plant for subsequent commercialisation.

Conventional triphasic separators are generally gravity separators, which take advantage of the different density of the three components to separate the mixture: in practice, the denser water phase is left to form a layer on the bottom of the container and the less dense oil phase forms a layer above it, whereas the gas dispersed in the mixture rises to the area above the two liquid layers. In addition to the size, these apparatuses also have the drawback of having a very low separation efficiency.

A system for the separation of two liquids having different densities, which may also contain a gas, is disclosed in European patent application No. EP0955076A1. This system is based on the use of a cylindrical separator with an inlet for the mixture to be separated in the upper part where a first gas-liquid separation occurs: the gas exits from a nozzle positioned in the upper part of the side walls while the liquid-liquid mixture stratifies below the upper part of the separator. A vertical duct 11 is positioned so as to put in communication the upper part with a lower part of the separator, and includes packings structures. The passage through these structures promotes a first separation of the two liquids by coalescence. The use of such structures is limited, for instance by the presence of solid residues in the mixture, which may cause a block. Moreover, in this system the upper and the lower parts are separated between each other, not allowing the fluid communication between the separated less dense liquid phase and the gas and consequently the release of the gas possibly trapped in the liquid phase; the gas is therefore dragged within the liquid phase.

The International patent application No. WO 2011/054192 discloses a partial separator of water from a triphasic stream water-oil-gas having a high content of water. This vertical separator has a cylindrical configuration suitable to be mounted on oil pipes for reducing the water cut of the multiphase stream. In one of the embodiment disclosed in WO 2011/054192 the separator is divided in an upper and a lower part: the upper part, where the gas-liquid separation occurs, is provided with the inlet for the stream and is connected to the lower part by means of a vertical pipe provided with a float valve which discontinuously regulates the stream of the water-oil mixture in the lower part of the separator; here part of the water in the water-oil mixture is separated by gravity. This system only carries out a partial separation of the triphasic mixture and for its operating modes it is suitable mainly on land or on platforms.

In the case of subsea reservoirs consisting of a plurality of wells, in industrial applications a single separator is usually fed by many wells. In this case, the separator is necessarily very large, also due to the possible presence of liquid slugs in the supply, where by the term "slug" are indicated alternating blocks of liquids and gas coming out from the reservoir. As can easily be understood, separators of this type are difficult both to install and to manage, and their potential collapse can constitute an unsustainable environmental and economic risk.

In British patent No. GB2394737 a modular system is disclosed for the separation of phases in a multiphase stream, suitable for subsea applications. A separation system is disclosed in this patent where the fluid to be separated is selectively conducted to at least a first gravity separator and at least a second gravity separator in parallel or in subsequent steps depending on the properties of the fluid and process conditions, in combination with other separation systems such as hydrocyclones or electrostatic coalescers. The presence of such systems allows the upstream separation of the gaseous phase and the consequent simplification in controlling the modular separation system, but it makes the overall system much less reliable in terms of maintenance and frequency of breakages.

Therefore, there is still a need for an apparatus allowing triphasic separation that is efficient, compact, low in cost and that can be used on the surface, but also and particularly on the seabed in the case of subsea reservoirs. The advantage of having the separator on the seabed is substantial, since it avoids for instance bringing to the surface the water and oil mixture, being possible to re-inject the water produced in a suitable subsea well dedicated to the re-injection of water.

SUMMARY OF THE INVENTION

A purpose of the present invention is to provide an apparatus for the separation of oil-water-gas mixtures suitable in particular, but not exclusively, for use on seabed, structurally simple, small in size, cost-effective, efficient in separation, without requiring long waiting times or special maintenance operations.

A further purpose of the invention is to provide a simple and efficient process for the separation of triphasic oil-water-gas mixtures that, at the end of the separation process, allows recovery of clean water with an oil content below the limit required for re-injection of the water to the bottom of the well.

Yet another purpose of the invention is to provide a modular system for the separation of oil-water-gas mixtures coming from a plurality of wells, based on gravity separation, particularly, but not exclusively, suitable for use on the seabed, that is structurally simple, reliable and cost-effective, consisting of several separators of small size, having the aforementioned characteristics of simple management and installation, as well as of high efficiency of separation without requiring long residence times or special maintenance operations.

Such purposes are accomplished by the apparatus according to the present invention, by the separation process that uses such an apparatus, and by the modular system comprising two or more apparatuses according to the invention placed in fluid connection with each other, the essential characteristics of which are defined in the independent claims attached hereto.

Further important characteristics are contained in the dependent claims.

BRIEF DESCRIPTION OF THE INVENTION

The characteristics and advantages of the separator apparatus of the invention and of the relative process will become clearer from the following description of an embodiment thereof, made as an example and not for limiting purposes with reference to the attached drawings, in which.

DETAILED DESCRIPTION OF THE INVENTION

Figure 1:
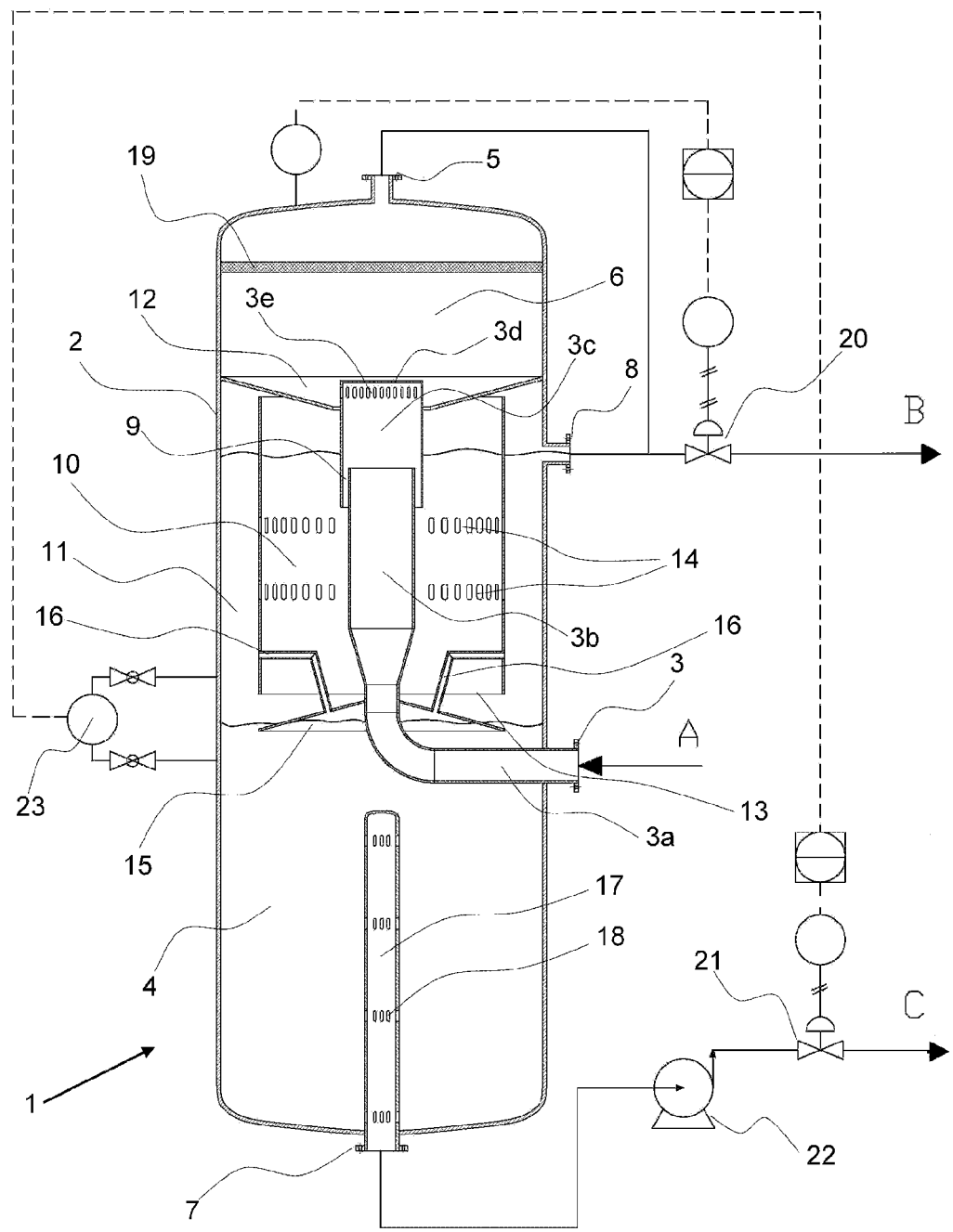
FIG. 1 shows a section view of an embodiment of the apparatus according to the invention.

With reference to said figures, an apparatus according to the invention comprises a main body 1 comprising a vertical tank 2 having an essentially cylindrical shape, having an inlet 3 of the oil-water-gas mixture A to be treated, arranged in a lower part 4 of the tank, and at least an outlet 5 for gas emission positioned in an upper part 6 of the tank.

The inlet 3 of the apparatus according to the invention has a conformation such as to allow a uniform distribution of the triphasic mixture oil-water-gas towards the upper part 6 of the body 1, from which the gas comes out and the oil-water liquid mixture is left to fall downwards. For example, the inlet 3 consists of an inlet, of a known type, that is tangential with respect to the body 1 in which, in the upper part 6 of the body 1, the flow conditions typical of cyclone gas-liquid separators are made. As an alternative to known inlets, the inlet 3 can be at the centre of the body 1, like in FIG. 1, consisting of a first horizontal part 3a and a second vertical part 3b, directed upwards; with this type of inlet, the final portion of the vertical part 3b preferably has an increased diameter with respect to the initial portion of the same vertical part, passing for example from 4" to 8" (i.e. from 10.2 to 20.3 cm), so as to carry out a preliminary separation of the gaseous phase from the two liquid phases, and at the same time substantially decrease the amount of motion of the mixture fed to the separator.

Figure 2:
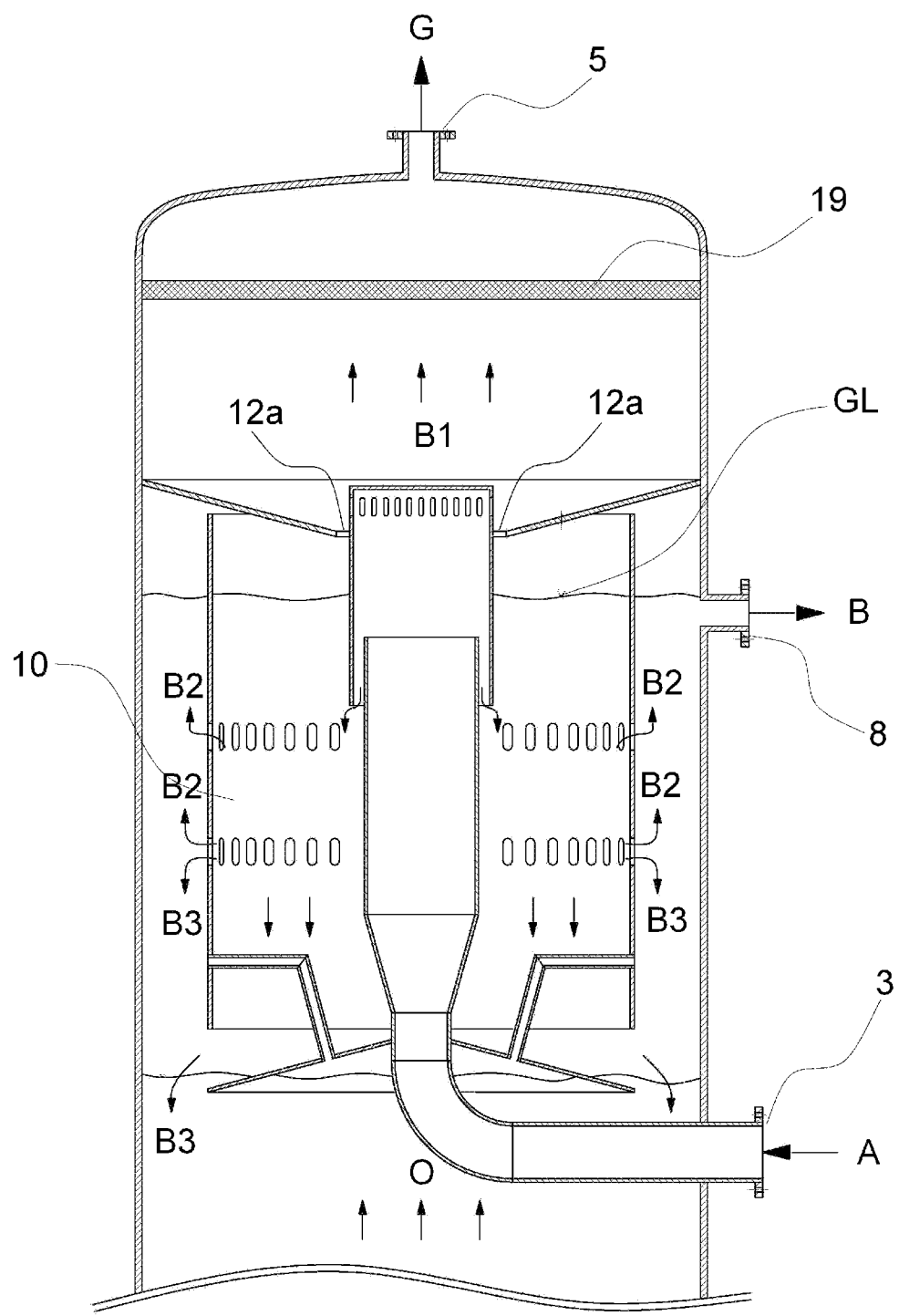
FIG. 2 shows a detail of the apparatus of FIG. 1.

In FIGS. 1 and 2 a further portion of the vertical part with increased diameter is indicated as 3c, and it is made with a pipe of greater diameter with respect to the part 3b, for example 10" (i.e. 25.4 cm), and of length equal to 2-3 times its diameter. The upper section of the part 3c is closed by a flat wall 3d, or alternatively by a rounded head. Beneath the head, on said section of pipe 3c a series of holes 3e are made radially, which allow the gas emission in the radial direction. The two liquid phases separated from the gas come out through the annular section 9, formed between the final part of the vertical feeding section 3b and the section of pipe 3c with greater diameter, positioned above.

Irrespective of the type of supply of the separator (with tangential or central inlet as described above) in the lower part 4 of the tank 2 there is at least an outlet 7 for the clean water to be re-injected into a dedicated subsea well, whereas in an intermediate area between the upper part 6 and the lower part 4 at least an outlet 8 is positioned for the oil obtained from the separation.

This intermediate area of the tank 2 also houses a duct 10 that is positioned coaxially with respect to the tank and has a substantially cylindrical shape and diameter smaller than that of the tank 2 so as to create, with the inner walls of the tank, an annular interspace 11. Preferred is an embodiment where the duct 10 has a diameter which is from 0.7 to 0.8 times the diameter of the tank 2. Above the duct 10 a sort of funnel 12 is positioned for conveying into the duct itself, through an annular opening 12a formed between the funnel 12 and the portion of the vertical part 3c, visible in FIG. 2, the liquid mixture that possibly is separated in the upper part 6 of the tank, at the same time leaving the upper part 6 and the lower part 4 of the tank in fluid communication. The duct 10, filled with liquid up to the outlet 8, creates a forced path for the liquid mixture in inlet that necessarily enters into the duct 10 and comes out from it through an outlet 13, which is actually its opened bottom base, toward the lower part 4 of the tank.

According to a particular embodiment, the duct 10 can be equipped with one or more series of slits 14, having preferably the same shape and size, uniformly radially distributed, and all at the same height of the duct 10. Each series of slits 14 places the inside of the duct 10 directly in communication with the interspace 11, allowing the mixture to come out also at the level of the slits, as well as from the opened bottom base 13.

The presence of the series of slits 14, preferably at roughly ⅔ the height of the duct 10, allows the liquid to come out at a certain height, as explained in greater detail hereafter and can contribute to advantageously keeping the flow inside the duct regular and sufficiently slow as to allow an efficient separation of the three components of the starting mixture by only gravity.

According to a particular embodiment of the invention, the passage area of the liquid in the duct 10 can be of comparable value to the passage area in the interspace 11. Moreover, the slits 14 can for example each have a width comprised between 1 and 2 cm, and preferably equal to 1.5 cm, and a height equal to about 3 times the width.

According to a particular configuration of the present separator apparatus, as indicated in FIGS. 1 and 2, beneath the duct 10 it is possible to position a frusto-conical shaped section 15, which can have a dual function, of conveying the flow of liquid that goes down from the duct 10 towards the wall of the separator apparatus, and of collecting the oil drops that rise in the lower part of the separator in counter-current with respect to the aqueous phase and through a series of ducts 16 allowing the oil thus collected to flow into the interspace 11.

The ducts 16, that place the lower part 4 of the tank in fluid communication with the interspace 11, are engaged on the frusto-conical shaped section 15.

Beneath the frusto-conical shaped section 15 there can be a secondary separator, capable of carrying out the separation by coalescence or by gravity, or a pipe 17, equipped with suitable holes 18, which allows an optimal distribution of speeds of the aqueous phase inside the separator. Such a central pipe 17 can have a diameter from ⅓ to ⅕ of the diameter of the separator body 1 and a height equal to 1-5 times the diameter of the body 1 of the separator. The pipe 17 thus configured allows an optimal distribution of speeds of the aqueous phase inside the separator, and at the same time a significant decrease in the speed of descent of the water from the separator.

As an example, if we assume that the diameter of the separator is equal to D=600 mm for a generic flow rate of water in outlet Q, in the absence of pipe the average speed of descent of the water is:

$$v = \frac{Q}{\pi \frac{D^2}{4}} = 4Q/\pi D^2. \tag{1}$$

When there is a pipe of diameter d=⅓D, and of height H=3D, the speed is $$v = \frac{Q}{\pi\left(\frac{D}{3}\right)3D} = Q/\pi D^2 \tag{2}$$

The speed in the presence of pipe worked out according to equation (2) is lower than the speed without pipe according to equation (1). The presence of the pipe thus means an increase in the residence time of the water in the lower part 4 of the separator, which promotes the further separation by gravity of the oil from the water in this area. The embodiment of the separator of the invention comprising the central pipe 17 combines constructive simplicity with the aforementioned technical advantages, and it is therefore a preferred embodiment of the present separator device.

With the apparatus described above, the separation of the gaseous component takes place in the upper part 6 of the tank by gravity, with most of the gaseous component that leaves the liquid phase coming out radially from the holes 3e and filling the upper part of the tank in which the suitable outlet 5 is located. The two liquid phases go down from the upper section 6 of the separator into the duct 10. The bubbles of gas that can initially remain trapped in the liquid phase, flowing downwards, continue to come out from the liquid thanks to the flow speed of the liquid mixture, kept at values even much less than 0.1 m/s.

These values of the descent speed of the liquid, besides allowing the release of gas bubbles pulled downwards by the liquid, also allow the establishment of a significant difference in the speeds (in descending vertical direction) of the two liquid phases in the case in which the dispersion of water in oil, or of oil in water, is not particularly fine.

Indeed, it is known from scientific literature that the terminal velocity of a liquid drop moving in a second liquid having different density is given by the expression:

$$U_S = 1.5\left(\frac{\Delta\rho}{\rho^2} g\ \sigma\right)^{0.25} \tag{3}$$

where $\Delta\rho$ is the difference in density between the liquids, $\rho$ is the density of the liquid that constitutes the continuous phase, $\sigma$ is the surface tension of the liquid that constitutes the drop, g is the acceleration due to gravity. The expression (3) is valid for drops of diameter greater than 3-5 mm and for these diameters it gives a speed value independent from the diameter; therefore, it only applies to the case of fairly coarse dispersions, for example of water in oil. The expression (3) allows a speed to be calculated equal to about 0.18 m/s in the case of a drop of water (of density 1000 kg/m³ and surface tension of 0.07 N/m) that moves in an oil of density 800 Kg/m³.

This speed decreases in the case in which the fraction in volume of the drops of water moving downwards with respect to an oil phase is substantial, but it still remains at significantly higher value than the value of the average descent speed of the two liquid phases in the duct 10, values that in separators of this type is, as stated earlier, even much less than 0.1 m/s. Under these conditions, the sliding between the two liquid phases makes it possible to obtain a significant preliminary separation thereof in the duct 10. Moreover, also in the case of high fractions in volume of water in the liquid fed to the separator apparatus, in the duct conditions are made such that the oil phase becomes the continuous phase. If, for example, we assume that the average speed of the mixture $U_M$ downwards is equal to 0.08 m/s and the relative speed of a group of water drops with respect to the oil phase is equal to 0.12 m/s, it is possible to calculate for various fractions of the ratio between total water/liquid in inlet to the separator, the concentration of water in the oil present in the duct 10. If $W_A$ is the flow rate in m³/s and $\alpha_A$ is the fraction of the water in the duct 10, $W_O$ and $\alpha_O$ are the flow rate and fraction of oil, A is the section of the tank, hence $$U_A = \frac{W_A}{\alpha_A A}, \ U_O = \frac{W_O}{\alpha_O A}, \tag{4}$$

where $U_A$ and $U_O$ are the average speeds of the water and of the oil in the duct 10. The relative speed between the liquid phases is therefore given by the following expression (5):

$$U_A - U_O = U_S \tag{5}$$

From the expressions (2) and (3), one obtains for $\alpha_A$ $$\alpha_A = \frac{\left(1 + \frac{U_S}{U_M}\right) - \sqrt{\left(1 + \frac{U_S}{U_M}\right)^2 - 4 \in_A \frac{U_S}{U_M}}}{2\frac{U_S}{U_M}} \tag{6}$$

where $\epsilon_A$ is the fraction of water fed to the separator.
Table A shows the results obtained for the three cases $W_A$=25%, 50% and 75% of the total liquid:

TABLE A

| $\frac{w_a}{w_a + w_o}$ | ($U_M$ = 0.08 m/s, $U_S$ = 0.12 m/s) | | |
|---|---|---|---|
| | $\alpha_A$ | $U_A$ (m/s) | $U_O$ (m/s) |
| 0.25 | 0.11 | 0.19 | 0.07 |
| 0.5 | 0.23 | 0.17 | 0.05 |
| 0.75 | 0.39 | 0.15 | 0.03 |

As it can be seen, in all of the cases considered, the fraction in volume of water $\alpha_A$ in the duct 10 is less than 50% of the fraction of water in inlet. This confirms that in the duct 10 the oil represents the continuous phase and that in the descending equicurrent motion of the two liquid phases there is a significant separation from one another. Moreover, as the average descent speed of the two liquid phases ($U_M$) in the duct 10 decreases, for example for the same flow rate of the two liquid phases using a separator of greater diameter, the fraction of water in oil $\alpha_A$ calculated according to the expression (4) given above, decreases. For example, for $U_M$=0.04 m/s and $U_S$=0.12 like in the previous case, for a fraction of water being fed equal to 0.5, we have $\alpha_A$=0.14. This value is much less than the value $\alpha_A$=0.23, given in Table A for $U_M$=0.08. Actually, at lower values of the fraction of water $\alpha_A$, the value of $U_S$ tends to increase and the overall effect of an increase in diameter of the duct 10 is accentuated, according to the expression (6), by an increase in $U_S$.

The equicurrent separation of the two liquid phases subject of the present invention represents an important difference with respect to conventional separation systems of two liquids by gravity, both horizontal and vertical. Indeed, in these conventional apparatuses the two liquids move with a speed component in the horizontal direction, but with motion in counter-current in the vertical direction, with the heavy phase moving in the descending direction and the light phase in the ascending direction. In the apparatus subject of the present invention, the counter-current flow conditions described above, relative to conventional separators, take place at the outlet of the duct 10 or, in the preferred embodiment of the present separator in which the slits 14 are present, both at the outlet of the duct 10 and in the series of slits 14 made in the duct 10, only after within the duct itself there has been a significant primary separation between the two liquid phases in equicurrent motion with each other, i.e. in the same direction, even at appreciably different descent speeds. At the outlet from the duct 10 (or both at the outlet from the duct 10 and in one or more side outlets consisting of one or more series of slits 14 made on the outer part of the duct 10) the two liquid phases separate, with the liquid phase of lower density flowing upwards in a suitable annular collection section of the phase having lower density (for example oil, or oil-rich oil/water mixtures), and the liquid phase of greater density (for example water, or water-rich water/oil mixtures) that continues to go down in the main cylindrical body of the separator, towards the lower part 4 of the tank.

As it also occurs in conventional separators, both the lighter liquid that moves upwards, and the heavier liquid that moves downwards, tend to drag dispersed drops of the other liquid. With respect to the speed of the two liquid phases in the duct 10 ($U_L$<0.1 m/s), the speeds of the two liquids at the outlet of the duct decreases appreciably. For example, if the flow rates in volume of the two liquids are equal and if the passage sections of duct 10 and of the annular collection section of the light liquid phase are also equal, the speeds of the two liquids after the primary separation take on a value equal to ¼ of the initial speed ($U_{L1}$, $U_{L2}$=0.025 m/s for $U_M$=0.08 m/s).

At these speeds the diameter ($D_P$) of the oil drops pulled by the water and of the water drops pulled by an oil of low viscosity is appreciably lower than the value so that the expression (3) given above is valid, and it can be obtained from the Stokes equation $$D_P = \sqrt{\frac{18\ U_L\ \mu_L}{g\ \Delta\rho}} \quad (7)$$

where $U_L$ is the speed of the continuous phase, $\mu_L$ is the viscosity of the liquid that constitutes the continuous phase and $\Delta\rho$ is the difference in density between the two liquids. For $U_L$=0.025 m/s, $\mu_L$=$10^{-3}$ Pa·s and $\Delta\rho$=200, from the equation (7) we get $D_P$≈0.5 mm. Under these conditions the efficiency of the separation depends on the fraction in volume of oil drops in water, or water drops in oil, of diameter smaller than 0.5 mm. For sufficiently coarse dispersions, this fraction can also be very limited. This happens in particular if the two liquid phases have not undergone substantial variations in pressure by crossing a control valve, or a pumping system. As far as the heavier liquid phase is concerned, i.e. the water in the case of the oil/water separation described above, there can also be a secondary separation system that takes the water to the required values for its re-injection.

The flow area of the mixture of the two liquids in outlet from the duct 10 increases significantly. The water, also thanks to its greater inertia, continues its motion in a descending direction, whereas the oil, which constitutes the continuous phase and moves more slowly than the water, rises in the interspace 11 towards the outlet 8. The level control system foreseen in this apparatus allows the interface between an oil-rich liquid phase ($\alpha_O$>0.98) and a water-rich liquid phase ($\alpha_A$>0.98) to be located below the outlet section of the duct 10, as illustrated in FIG. 1.

Downstream of the separation of the oil-water mixture carried out by gravity as described above, the water in outlet can be directly sent back by means of a pump to a water re-injection well or, if it needs a further separation from the oil component, it is subjected to a further separation in a secondary separation device arranged in the lower part 4 of the tank; such a device can for example be a conventional coalescence separator or another analogous device. As an alternative to the secondary separator, in the lower part 4 of the separator it is possible to position for example the pipe 17 described above.

In FIG. 2 the flow of oil that rises upwards coming from the secondary separator is indicated with O.

With reference to FIG. 2, in the upper part 6 of the tank there is preferably a gas demister 19, or another analogous device having the function of promoting the separation of the drops of liquid possibly pulled upwards by the gaseous current indicated with B1, and make them fall downwards where they will combine with the liquid mixture for entry into the duct 10. The gas-liquid interface is indicated with GL in FIG. 2.

Again with reference to FIG. 2, letter G indicates the flow of gas in outlet from the separator, and letter B2 indicates the flow of oil-rich mixture in outlet from the separator, flows which can combine in a single flow B as in the figures, or be directed to different storage containers through different pipes for possible further treatments. B3 indicates the flow of water in outlet from the separator. The flow rates of the flows B1 and B2 (before the possible recombining in the flow B) can be determined with suitable measurement tools installed at the outlet from the separator apparatus.

The separator apparatus according to the invention is of a shape and size that make it particularly compact and possibly suitable for example for burying its lower part in a second well of very low depth, perforated in the area adjacent to the head of the production well. The present apparatus can also be used in particular, but not only, as a separator to be positioned on the sea bed in subsea wells, i.e. as a so-called "subsea" separator.

The flows in outlet from the present apparatus can be controlled through a conventional control system, which controls pressure and levels of the liquids in outlet before being conveyed into separate ducts for re-insertion in the reservoirs and transportation to the relative storage plants. In the case in which the apparatus has the sole purpose of recovering clean water for re-injection, and oil and gas can be re-injected in a single duct for subsequent treatment, as shown in FIG. 1, then two control valves 20, 21 will adjust the outgoing flow B of gas and oil and the outgoing flow C of water from the separator, respectively. The valve 20 also has the function of adjusting the pressure inside the tank. Again with reference to FIG. 1, a pump 22 is comprised in the control system for the re-injection of the water; the suction speed of the pump is regulated by the valve 21 based on the information received by the control system 23 of the oil-water interface in the duct 10: in this way, the position of the oil-water interface and therefore the efficiency of the separation itself can be controlled further through the controlled pumping of the clean water in outlet from the separator.

In the present invention by the expression "clean water" for re-injection water is meant with an oil content, for example, less than 100 ppm, therefore having the required characteristics to be re-injected to the bottom of the well.

With the apparatus described above it is possible to implement a process of triphasic separation of water-oil-gas mixtures, comprising the separation by gravity of the liquid mixture from the gas in an upper part of a tank having an outlet for the gas, and the vertical and co-current separation by gravity of the water-oil liquid mixture substantially free from gas thus obtained, through passage at controlled speed of the mixture itself in a vertical duct 10 arranged in an intermediate area of said tank, with a substantially cylindrical shape and diameter smaller than the inner diameter of the tank so as to create an annular interspace 11, said duct 10 optionally being equipped with a series of parallel slits 14, preferably of the same shape and size as each other, arranged at a regular distance from one another, which place the inside of the duct 10 in communication with the interspace 11, so that the oil-water mixtures come out from the duct 10 through the opened bottom base 13 towards the bottom of the tank, with the water continuing in its motion in a descending direction so that water-rich mixtures are collected in the low part of the tank and possibly directed to a secondary separator for a further separation before re-injection, whereas the oil tends to rise in the interspace 11 so that oil-rich mixtures are conveyed towards an outlet 8 in the intermediate area of the tank. When there are the slits 14 on the duct 10, oil-rich oil-water mixtures come out from said slits, whereas water-rich oil-water mixtures come out from the duct through the opened bottom base 13 towards the bottom of the tank, from which they are optionally directed to a secondary separator for a further separation before re-injection at the bottom of the well.

The controlled speed of the mixture when passing through the duct 10, which allows the vertical and co-current separation by gravity of the components in the mixture as described above, is obtained thanks to the configuration and dimensions of the present apparatus, and in particular to the relative dimensions of the tank 2 and of the duct 10, which allows the flow of the mixture to move downwards with a low speed, for instance with a speed lower than 0.1 m/s.

The size of the separator is small in the case in which the three phases fed to the separator are not finely dispersed, and it can be further reduced if just a partial separation of the gas from the liquid phases and of the water from the oil is carried out, although the separation of the oil from the water to be sent to re-injection can be extended to very low concentrations (e.g. <100 ppm). For this purpose, the present triphasic separator apparatus can also advantageously have a secondary separation apparatus of the oil not separated from the water associated with it. The proposed apparatus is particularly, but not exclusively, advantageous in the case in which it is not necessary to treat fine dispersions and it is possible to carry out a partial separation of the phases, apart from, if required, a high purity of the water to be sent for re-injection.

In the present invention by "water-oil mixture substantially free from gas" an oil-water liquid mixture is meant containing an amount of gas less than 1%, by the expression "oil-rich oil-water mixtures" oil-water mixtures are meant in which the amount of water is less than 2% and by "water-rich oil-water mixtures" mixtures are meant in which the amount of oil is less than 2%.

In the process according to the invention, the apparatus for triphasic separation described above is advantageously positioned close to the well, preferably before the control valve of the flow in outlet from the well itself. In this way, the apparatus can indeed operate under high pressures, for example above 100-200 bars, at which the fraction in volume of gas is limited, and its separation is easier. On the other hand, in possible valves positioned at the head of the well there can indeed be large pressure losses with formation of even very fine dispersions of the three phases, for example of gas and water in oil, and the positioning of the separator apparatus downstream of the control valve contributes to increasing the efficiency of separation.

The apparatus according to the invention can be designed differently to suit each circumstance, for example with respect to shape and size, depending on the flow rates of gas, oil and water to be treated. In many applications, it may be useful to position the separator apparatus of the invention near to a single production well, feeding the separator with just the flow coming from this well. In these cases, the separator apparatus has a low volume, and it can advantageously be designed as a vertical separator, having a substantially cylindrical shape, with a height/diameter ratio comprised for example between 2 and 4. Such a height/diameter ratio can also be advantageously higher in the case in which it is possible and advantageous to carry out a partial burying of the separator, or if in the lower part of the separator it is foreseen to use a secondary oil-water separation method having vertical extension.

The main advantage obtained with the apparatus positioned near to the well feeding it, consists in that, without a long pipe connecting between the production well and the apparatus for the separation, there are no long accumulations of liquid, known as "slugs", generated in the pipeline and fed to the separator apparatus, to remove which it would be necessary to provide a suitable collection volume inside the separator.

A further advantage of the positioning of the apparatus near to the well is represented by the fact that the temperature of the fluid to be treated is higher than when the apparatus is positioned at a distance from the well, with the consequence that the separation between the phases is easier and the risk of formation of undesired solid phases, such as waxes, hydrates, and the like, is lower.

In cases in which it is necessary to treat fluids coming from several adjacent wells, the modular system of the invention constitutes a particularly advantageous solution. The present modular system indeed consists of a series of separator apparatuses as described above, of equal dimensions, arranged in parallel, and in fluid communication with each other, fed by a manifold to which the production wells are connected.

Figure 3:
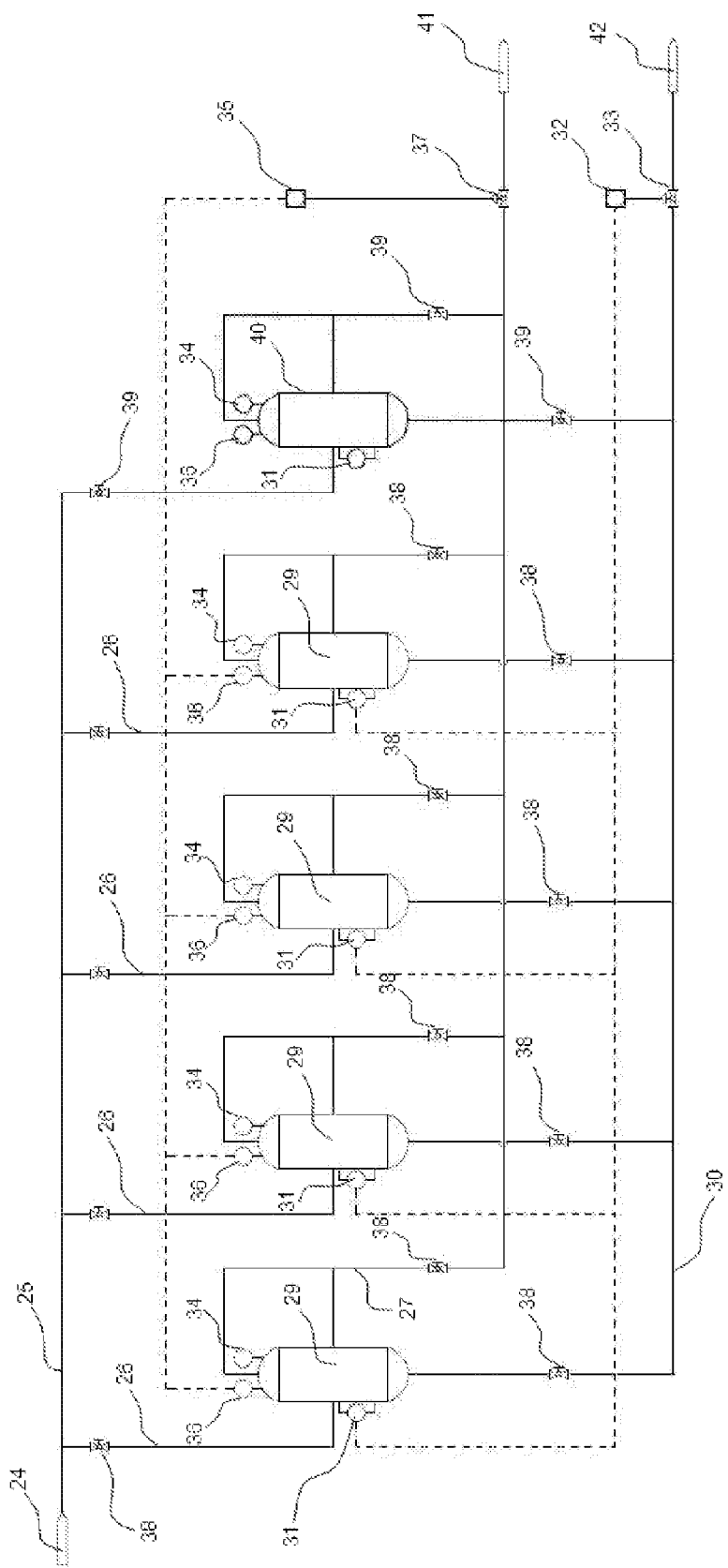
FIG. 3 shows a modular system according to the invention consisting of four separator apparatuses in fluid connection with each other, fed by a plurality of wells.

With reference to FIG. 3, reference numeral 24 indicates the production fluid coming from the plurality of wells that, conveyed in a production manifold 25, is distributed inside the separator modules connected to the collector 25 through the pipes 26.

Given the low probability that all of the wells will simultaneously have slugs, the particular configuration in parallel between the modules ensures that possible slugs that might come out from time to time from the single well can be redistributed inside the plurality of separation modules, avoiding having to oversize the separators to tackle possible slugs as normally occurs in single-separator configurations for a single well, with consequent greater overall efficiency of separation.

The flows of gas and oil coming out from each separator in the modular configuration illustrated in FIG. 3 are conveyed together through the pipe 27 through oil/gas manifold 28 to the production centre 41, whereas the flows of water-rich mixtures that come out from each separator 29 are conveyed to the centre 42 through a suitable manifold 30 for further treatments or re-injection.

The present modular configuration with the separators in fluid communication with each other allows, during normal operation, the mutual rebalancing of the liquid-liquid levels of the single separators. A level sensor 31 is preferably present in each separator, to detect the level of the oil-water mixture inside, so that, when the sensor 31 detects a higher or lower level with respect to the predetermined level range, a control system 32 acts on a pump 33 to respectively open or close the flow into the manifold 30.

In each of the separators there is preferably a temperature detector 34 and a pressure detector 36, to respectively detect the temperature and pressure values inside the separator.

The pressure in the separation system may advantageously be controlled through a control system 35 that, when one of the pressure sensors 36 installed on each of the separators, detects an increase or decrease in pressure with respect to the predetermined one, acts on a valve 37, respectively opening or closing the flow in the manifold 28.

According to a preferred embodiment of the present invention, a single level (32) and pressure (35) control system is comprised in the overall modular system, with the level control system (32) acting on a pump (33), so that, when the sensor (31) detects in one of the tanks an oil-water level higher or lower than a predetermined level range, the level control system (32) acts on said pump (33) for opening or respectively closing the water flow to be re-entered after separation in the manifold (30), while said pressure control system (35) acts on a valve (37) so that when the pressure sensor (36) detects a pressure increase or decrease with respect to a predetermined value, said control pressure system (35) acts on said valve (37) for opening or respectively closing the gas-oil mixture flow to be sent to the manifold (28).

According to a preferred embodiment, the modular system according to the invention provides the installation of interception valves 38 on the pipelines upstream and downstream of each separator, so as to be able to isolate each separator from the pipeline without affecting the working of the other separators.

On the present modular system it is possible to arrange some attachments 39 on which to possibly install additional or emergency separators 40.

The modular separation system according to the invention has at least the following advantages:
- the system can be set up to comprise a variable number of modules in relation to the production requirements;
- the maintenance activities and costs are reduced, also thanks to the fact that each single module can easily be replaced, without compromising the efficiency of the system;
- a single control system of the pressure and level of the fluids can be used for the entire system, to control all of the modules;
- the volume necessary to receive possible slugs of liquid is divided among all of the modules, rather than in a single separator, with consequent greater efficiency with lower volumes.

The present invention has been described up to now with reference to a preferred embodiment thereof. It should be understood that there can be other embodiments deriving from the same inventive core, all of which are covered by the scope of protection of the following claims.

The invention claimed is:

1. An apparatus for the separation of triphasic mixture oil-water-gas, comprising a main body comprising a substantially cylindrical, vertical tank, having an inlet of the mixture oil-water-gas (A) to be treated and an outlet for water, located in a lower part of said tank; at least an outlet for the gas emission in an upper part of said tank; and at least an outlet for the oil in an intermediate part between said upper part and said lower part, said apparatus further comprising a duct being coaxially positioned within said tank in said intermediate part, having an opened bottom base towards said lower part and being opened in the upper part, and having substantially cylindrical form and a smaller diameter than that of said tank so as to create an annular interspace with said tank in fluid communication with both said upper part and said lower part and with said outlet for the oil, said inlet of the mixture to be separated having such a conformation to direct the gas towards said upper part and the liquid mixture oil-water, also when gas is present, in the upper part of said duct.

2. The apparatus according to claim 1, wherein said duct has a diameter from 0.7 to 0.8 times the diameter of said tank.

3. The apparatus according to claim 1, wherein said inlet of the mixture oil-water-gas comprises a first horizontal part and a second vertical part having a final portion of greater diameter with respect to the vertical part, upperly closed by means of a flat wall and lowerly provided with an annular opening and with at least a series of holes on the surface, so as to allow the gas emission in radial direction in said upper part of the tank, and the outlet of the mixture oil-water through said annular opening inside said duct.

4. The apparatus according to claim 1, wherein on said duct one or more series of slits are made, that put into communication said interspace with the inner part of said duct.

5. The apparatus according to claim 4, wherein said slits are equal amongst each other in form and dimensions, positioned at regular distance amongst each other, and all at the same height of said duct.

6. The apparatus according to claim 4, wherein said slits are positioned at approximately ⅔ of the height of said duct.

7. The apparatus according to claim 1, wherein a frusto-conical shaped section is positioned below said duct, from said section channels being departing that put said lower part of the tank in fluid communication with said interspace.

8. The apparatus according to claim 7, wherein below said frusto-conical shaped section a central pipe is positioned, which has holes that put said lower part of the tank in communication with said outlet directing water towards said outlet.

9. The apparatus according to claim 7, wherein below said frusto-conical shaped section a secondary separator is positioned that carries out a further separation of the oil component before directing water towards the outlet.

10. The apparatus according to claim 1, further comprising a gas demister positioned in said upper part of said tank so that the gas flowing towards outlet passes through it.

11. A process for the triphasic separation of a mixture oil-water-gas in a separator apparatus, comprising the gravity separation of a liquid mixture oil-water from gas in an upper part of a tank having at least an outlet for the gas, and a preliminary separation of said liquid mixture into oil-rich or water-rich oil-water mixtures by flowing at a controlled speed value in a vertical duct having an opened bottom base towards a lower part of said tank and being opened in said upper part, said duct being substantially cylindrical, coaxially arranged with respect to said tank and of smaller diameter than that of said tank so as to create an annular interspace and so that said separation of the liquid mixture takes place in co-current mode by gravity in said vertical duct and originates two flows of water-rich and oil-rich mixtures that, moving at a controlled fluid speed value, separate due to their going down in the duct with different downward speed values, after the opened bottom base the oil-rich mixtures going up in the interspace while the water-rich mixtures going down in the lower part of the separator.

12. The process according to claim 11, wherein said duct has a diameter from 0.7 to 0.8 times the diameter of said tank.

13. A modular system for the separation of oil-water-gas mixtures comprising two or more triphasic gravitational separator apparatus as described in claim 1, in fluid communication amongst each other and each having an opening for the independent inlet of the mixtures to be separated.

14. The modular system according to claim 13, wherein each separator comprises a level sensor for detecting the level of the oil-water mixture inside the separator and a single level and pressure control system for the overall modular system, said level control system acting on a pump, so that, when the sensor detects in one of the tanks an oil-water level higher or lower than a predetermined level range, said level control system acts on said pump for opening or respectively closing the water flow to be re-entered after separation in a suitable manifold, while said pressure control system acting on a valve so that when the pressure sensor detects a pressure increase or decrease with respect to a predetermined value, said control pressure system acts on said valve for opening or respectively closing the gas-oil mixture flow to be sent to a suitable manifold.

15. The modular system according to claim 13, comprising interception valves on the pipelines upstream and downstream of each separator, so as to isolate each separator from the pipeline if needed without affecting the working of other separators.

* * * * *